Aug. 16, 1927.
H. A. PINCHBECK ET AL
1,638,956
FRUIT KNIFE
Filed April 21, 1926
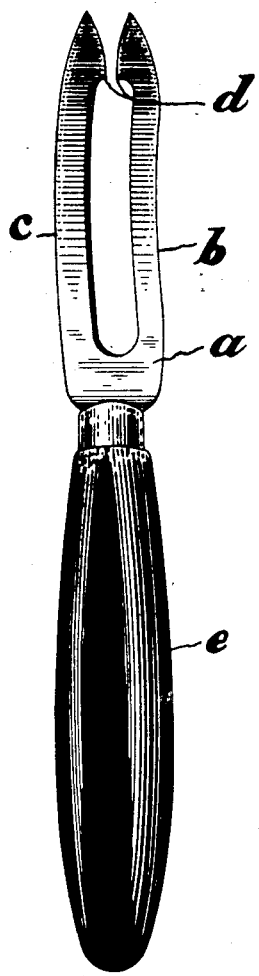
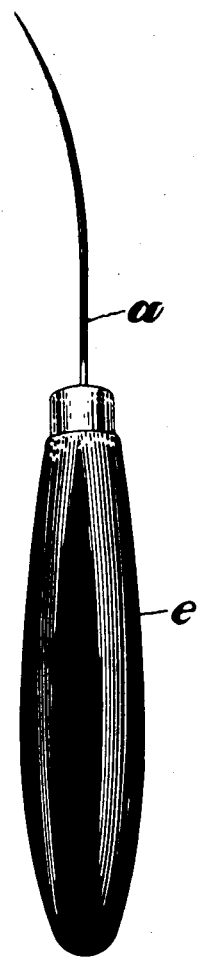
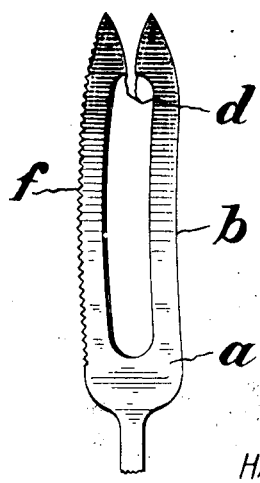
INVENTORS.
HARRY ARTHUR PINCHBECK AND
ARTHUR SAMUEL PINCHBECK,
BY Edward Williams, THEIR ATTY.

Patented Aug. 16, 1927.

1,638,956

UNITED STATES PATENT OFFICE.

HARRY ARTHUR PINCHBECK AND ARTHUR SAMUEL PINCHBECK, OF LONDON, ENGLAND.

FRUIT KNIFE.

Application filed April 21, 1926, Serial No. 103,608, and in Great Britain July 22, 1925.

This invention relates to implements or appliances suitable for preparing fruits such as grape fruit or oranges so as to enable them to be easily eaten.

A device for this purpose hitherto suggested consisted of a handle having at one end a spatulate knife and at the other end a fork member having two prongs having trident barbed points. The knife portion of the device is suitable for cutting the edible part of the fruit from the skin and the fork portion suitable for removing the seeds and the core of the fruit.

Such a device is awkward to manipulate owing to the handle being between the knife and the fork portions and the object of this invention is to provide an improved device of this character. To that end it consists in providing a suitable handle on which is mounted a single blade so shaped that it can perform both the operations above mentioned.

According to one modification the blade is in the shape of a two pronged fork each prong being provided with a single barb on the inside. This form is illustrated in front and side elevation respectively in Figs. 1 and 2 of the accompanying drawings, from which it will be seen that the blade is slightly curved in profile from handle to tip so that in removing the seeds and core from the fruit it has a spoon-like action. The outer edges of the prongs are thin cutting edges so that the blade can be used to sever the edible portion of the fruit from the skin or rind. In Figs. 1 and 2, a represents the blade having prongs b and c provided with barbs d on their inner edges, the blade being mounted in a handle e.

In the modification illustrated in Fig. 3 the prong c is provided with a serrated edge f which may be utilized to cut the edible portions of the fruit from the rest. These serrations may be on either or both prongs or they may extend along the edge for a short distance only. The blade may be secured to any suitably shaped handle in any well known method.

What we claim as new and desire to secure by Letters Patent of the United States is:—

1. A combined fruit cutting and seeding device consisting of a handle, a U-shaped cutting blade curved in profile and provided with re-entrant seeding barbs at the extremities thereof.

2. A combined fruit cutting and seeding device consisting of a handle, a U-shaped cutting blade curved in profile and provided with coplanar seeding barbs at the inner edges near its extremities.

3. A combined fruit cutting and seeding device consisting of a handle, a U-shaped cutting blade curved in profile from tip to base and provided with arcuate shaped seeding barbs.

4. A combined fruit cutting and seeding device consisting of a handle, a U-shaped cutting blade curved in profile having elongated prongs provided with inwardly coplanar sharpened seeding barbs at the inner edges near its extremities.

5. A combined fruit cutting and seeding device consisting of a handle, a U-shaped cutting blade curved in profile and having the leg portions thereof directed inwardly at the inner edges near its extremities to form coplanar seeding barbs.

6. A combined fruit cutting and seeding device consisting of a handle, a U-shaped cutting blade curved in profile, the outer edges of the legs thereof being sharpened, and the inner edges of the leg portions directed inwardly at the extremities to form re-entrant sharpened seeding barbs.

7. A combined fruit cutting and seeding device consisting of a handle, a U-shaped cutting blade curved in profile from tip to base and having the leg portions thereof directed inwardly at the inner edges near its extremities to form re-entrant coplanar seeding barbs.

In witness whereof we have hereunto set our hands this seventh day of April, 1926.

HARRY ARTHUR PINCHBECK.
ARTHUR SAMUEL PINCHBECK.